March 10, 1970
G. G. CELAYAN
3,499,282
SMOG-CONTROL EQUIPMENT FOR INTERNAL COMBUSTION
ENGINES, INCINERATORS AND BOILERS
Filed Oct. 13, 1967
4 Sheets-Sheet 1
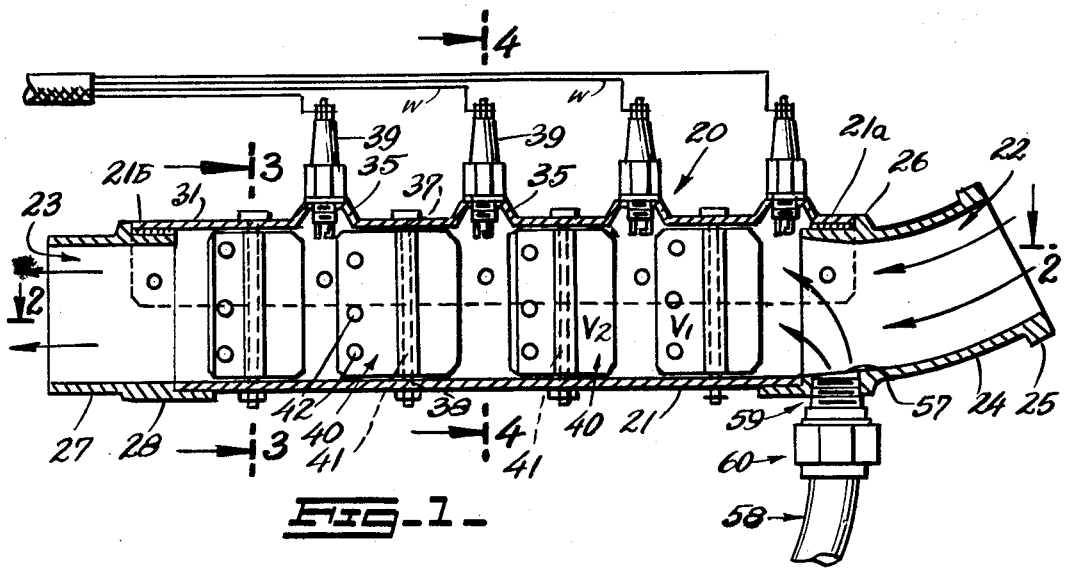
Fig-1-
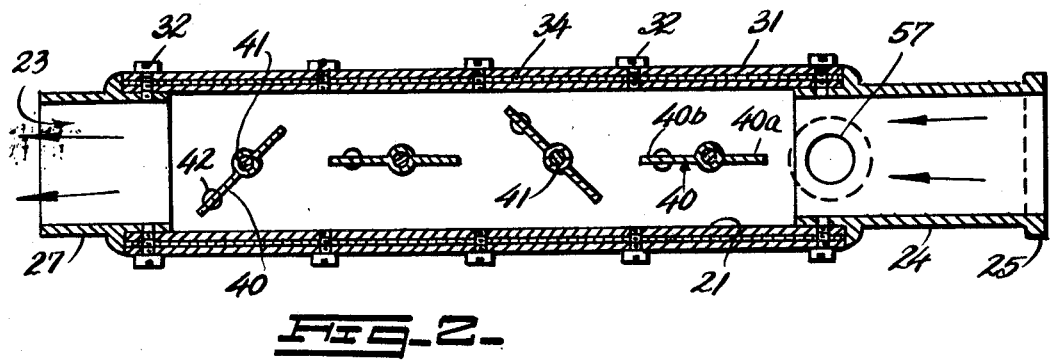
Fig-2-
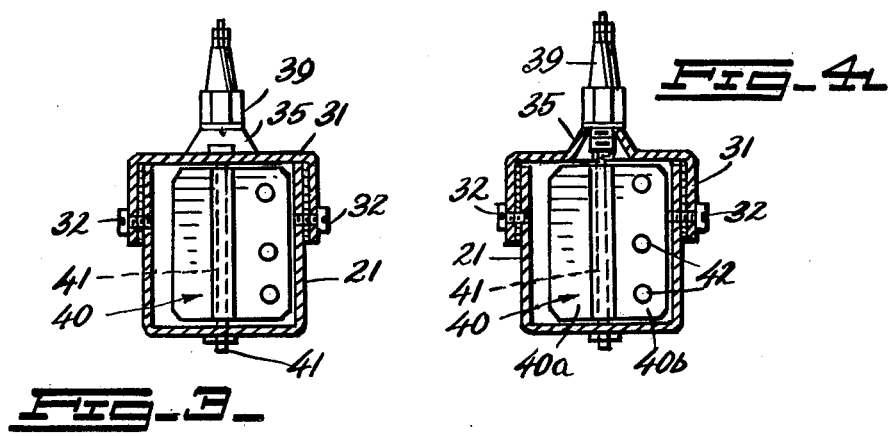
Fig-3-
Fig-4-

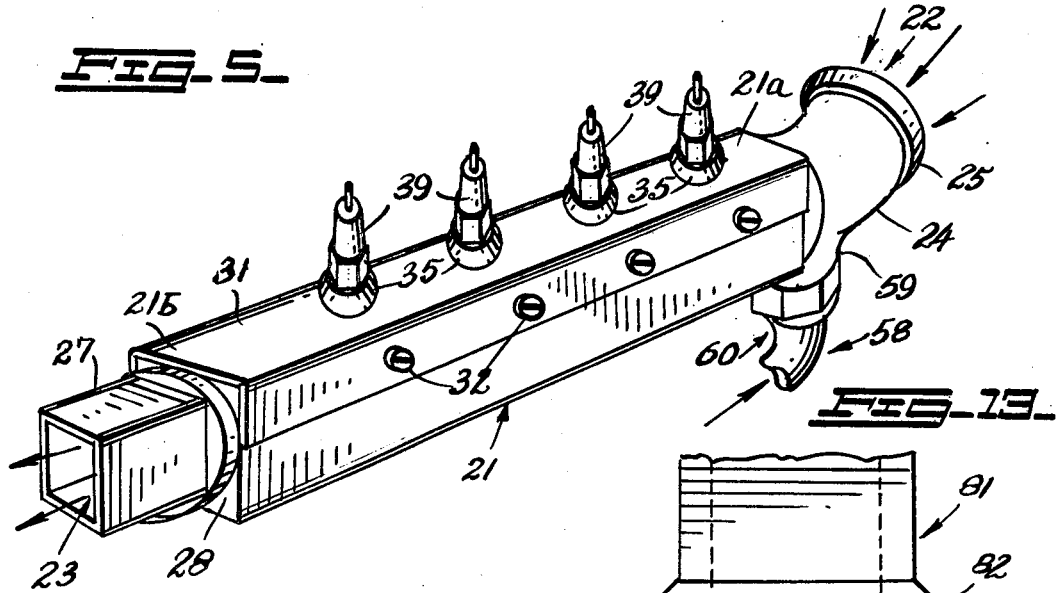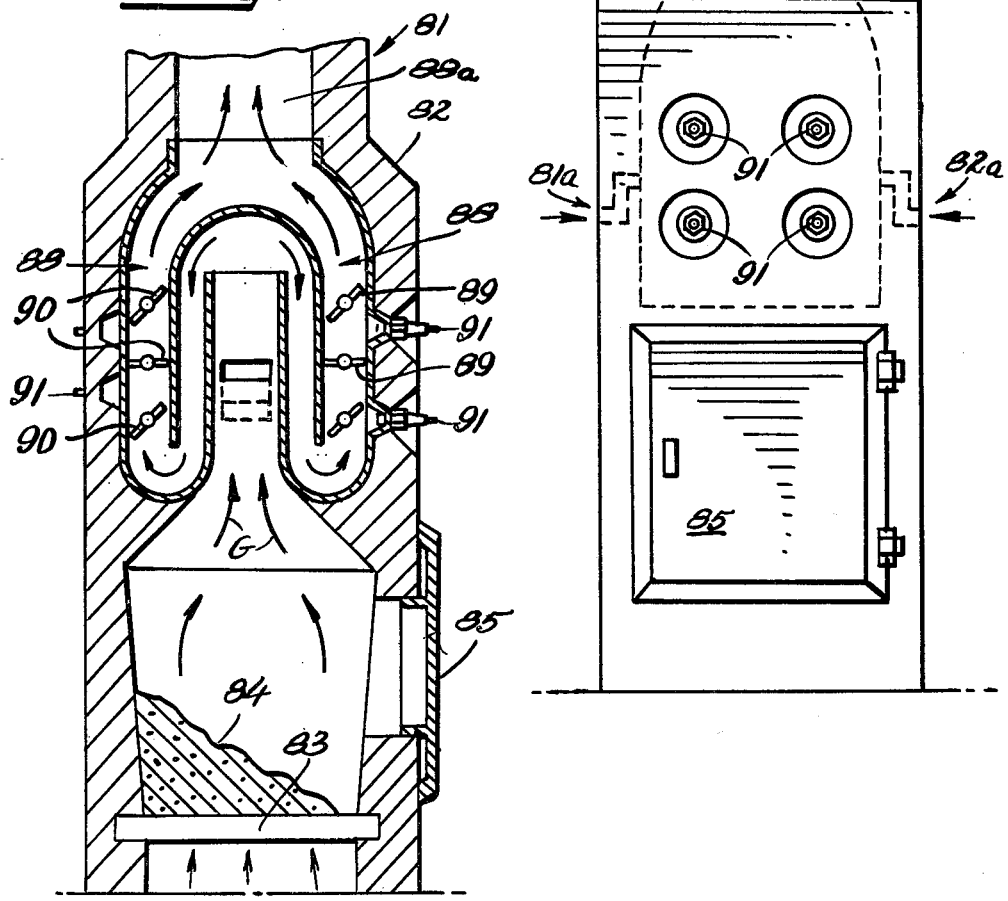

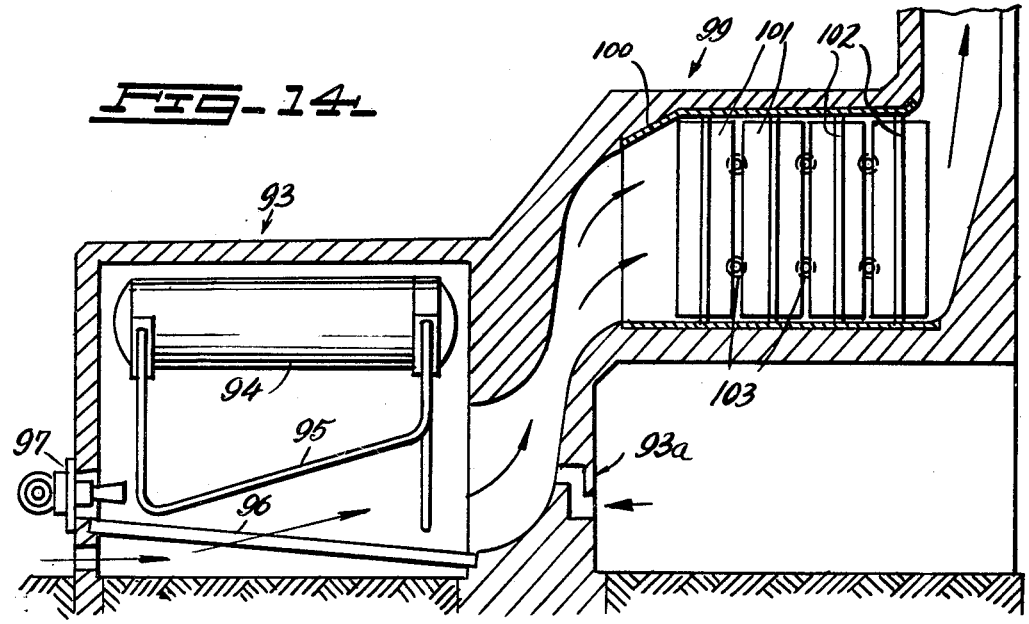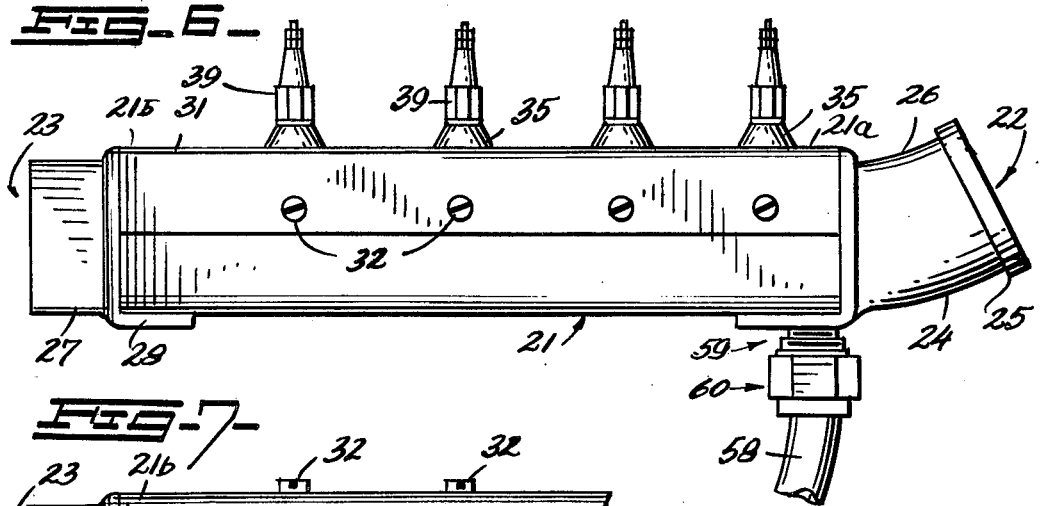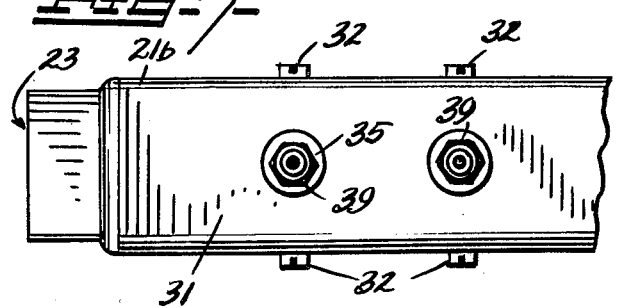

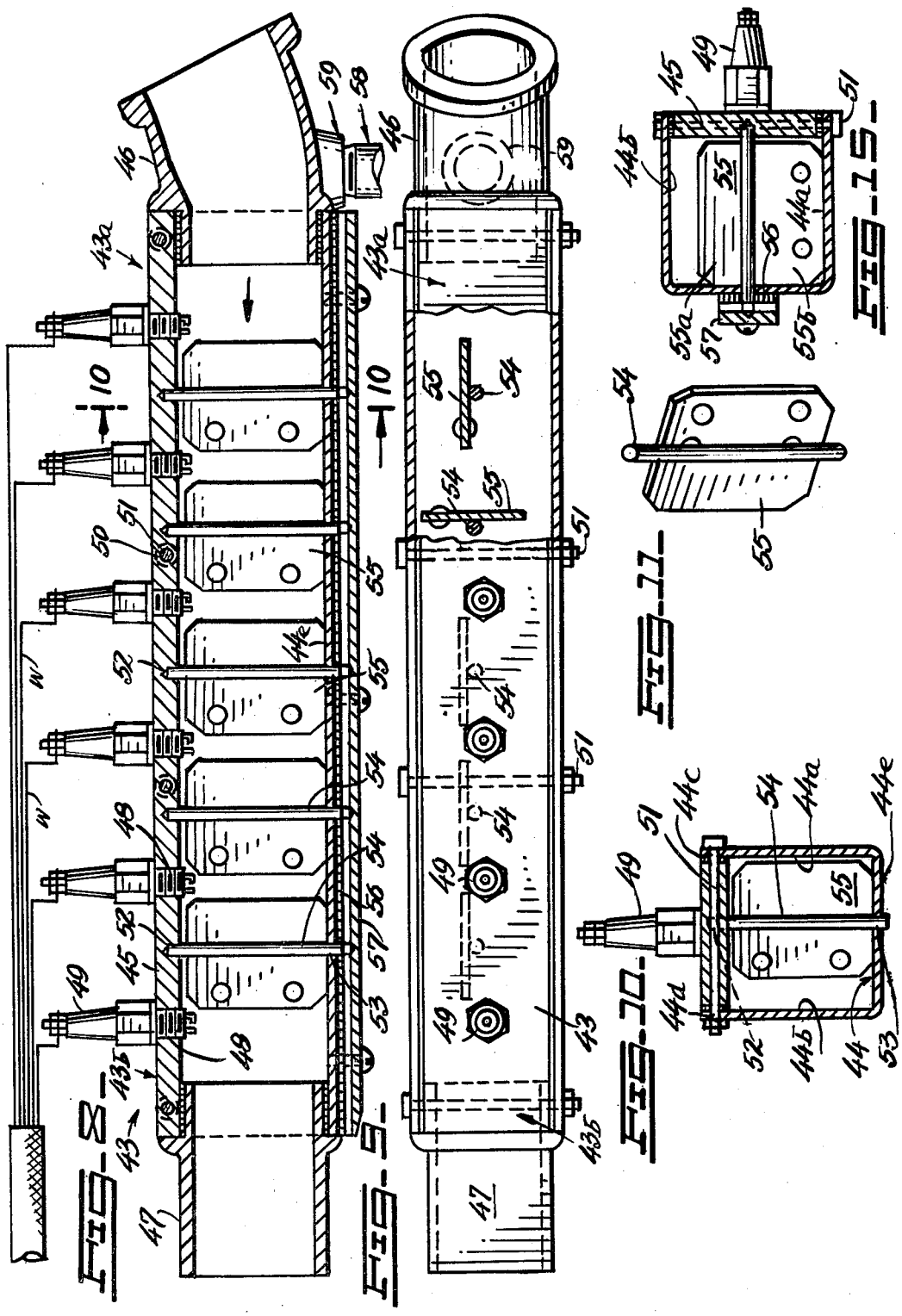

United States Patent Office 3,499,282
Patented Mar. 10, 1970

3,499,282
SMOG-CONTROL EQUIPMENT FOR INTERNAL
COMBUSTION ENGINES, INCINERATORS AND
BOILERS
Genaro G. Celayan, 317½ N. Beaudry Ave.,
Los Angeles, Calif. 90012
Filed Oct. 13, 1967, Ser. No. 675,757
Int. Cl. F01n 1/14; F23g 3/00
U.S. Cl. 60—30                                6 Claims

ABSTRACT OF THE DISCLOSURE

An elongated chamber has an air inlet and an exhaust gas inlet at one end with a series of butterfly vanes mounted for rotation along the length of the chamber and a spark-plug between each adjacent pair of butterfly vanes for igniting the mixture of exhaust gas and air as it passes along the length of the chamber.

---

The present invention prelates to smog-control equipment, and more particularly it relates to smog control devices of the class which can readily and efficiently eliminate volatile matter, poisonous carbon monoxide gas and hydrocarbons from the exhausts which are daily emitted by conventional internal combustion engines in automobiles, in trucks, in railroad Diesel engines, and in jet driven aircraft. More particularly the present invention also relates to means for eliminating volatile material and carbon monoxide gases in home incinerators, power generating stations and other similar installations.

In the past a variety of similar equipment have been suggested which purportedly were designed to eliminate poisonous gases from the exhausts of automobiles. In many states present laws and the Federal Government demand that the use of smog-control equipment in automobiles and in incinerators be strictly enforced. The automobile industry is planning to install smog control devices in all cars. However, it is debatable how efficient such equipment will be, and how inexpensive they will be in mass production. The present invention provides for a novel means of carbon monoxide gas elimination. It provides for a "smog blaster" which will be inexpensive to produce, easy to operate and safe to install.

Primarily the present invention provides an elongated and substantially narrow housing defining a narrow channel or passage into which the gases from an automobile may be readily exhausted. The exhaust gases from their point of entry later pass along the entire length of the narrow channel, which throughout its length is provided with a plurality of spark-plugs and (on the inside) with a plurality of butterfly type valves, or rotating vanes. The vanes are mounted for example on shafts to rotate as the gases pass through the narrow channel aforesaid. The spark-plugs provided on the outside are mounted in sequence, one between each adjacent pair of vanes, into threaded holes drilled in the housing. The connection points of the spark-plugs protrude above the housing and are connected onto a spark-plug distributor.

By means of the above mentioned vanes in the narrow channel, passage is divided into a number of separate blast chambers. The spark plugs mounted between each pair of vanes provide a repetitive spark for each section of the smog blaster to provide each blast chamber with a source of heat energy to burn the volatile matter contained in the exhaust gases, thus increasing the volume of the gas, and subsequently increasing its exhaust velocity. As the vanes turn under the influence of the moving gas, they permit the passage of the gas from one blast chamber to the other where the remaining volatile material in the gas is further reduced and the carbon monoxide gases are eliminated. Eventually the processed gas passes from the last blast chamber and is then exhausted into the atmosphere.

The above is a very concise description of the process of carbon monoxide elimination in my smog control device which may find ready application in automobiles. However, a similar process of carbon monoxide elimination may be readily utilized in home incinerators and commercial boilers. It is, of course, understood that for larger installations the spark-plug method may be dispensed with and instead flame burners may be utilized. When the heat dissipation generated is excessive, the vanes become heated to 500 degrees F., or above thus further improving the efficiency.

Accordingly, the main object of the present invention is to provide a smog control device of the class described which may be inexpensive to manufacture, safe to operate and easy to install.

Another object of the present invention is to provide successive blast chambers which gases through are passed to be processed so as to reduce carbon monoxide gases and hydrocarbons.

A further object of the present invention is to provide a device of the class described with an elongated, narrow, blast chamber or channel, and a number of rotatable vanes, to form between each pair of vanes a blast chamber.

Another object of the present invention is to provide a row of spark-plugs mounted upon housing the and connected by means of electrical leads to a spark plug for burning the exhaust gases.

Another object of the present invention is to provide a device of the class described to be readily utilized in connection with standard home incinerators.

A further object of the present invention is to provide a device of the class described which may find utilization in connection with conventional power generating stations.

A further object of the present invention is to provide a device of the class described which may readily eliminate carbon monoxide and hydrocarbons from the exhaust gases of conventional jet engines.

This invention also consists of certain other features of construction, and the combination and arrangement of parts, to be hereinafter fully described, illustrated in the accompanying drawings, and specially pointed out in the appended claims.

In describing the invention in detail, references will be made to the accompanying drawings, where like character numerals denote like or corresponding parts throughout the several views, in which:

FIG. 1 is a cross sectional view showing the preferred embodiment of the present invention.

FIG. 2 is a section taken on the line 2—2 of FIG. 1;

FIG. 3 is a section taken on the line 3—3 of FIG. 1;

FIG. 4 is a section taken on the line 4—4 of FIG. 1;

FIG. 5 is a perspective view taken in elevation;

FIG. 6 is a side elevational view of FIG. 5;

FIG. 7 is a top elevational view of FIG. 5, partially broken away;

FIG. 8 is a cross sectional view of another embodiment showing the manner in which the rotating vanes and the spark-plugs are mounted;

FIG. 9 is a top elevational view in partial section of another embodiment;

FIG. 10 is a section taken on the line 10—10 of FIG. 8;

FIG. 11 is a perspective view of one of the vanes shown in FIG. 8;

FIG. 12 is a section through a home incinerator showing the application of the present invention to this type structure;

FIG. 13 is a side elevational view of FIG. 1;

FIG. 14 is showing the embodiment of the present invention in its application to power plants and boilers; and FIG. 15 is a section similar to the section 10—10 in FIG. 8 showing further details.

It is understood that the present form of disclosure is merely for the purpose of illustration, and that there might be various modifications thereof, without departing from the spirit of the invention as herein set forth.

Referring now more particularly to FIGS. 1 and 2, the smog control device 20, in accordance with the present invention, has a housing 21 defining an elongated channel or the passage 21 with a gas intake opening 22 at one end, and a gas exhaust opening 23 at the other end. The intake opening 22 may be formed or may be fitted with an arcuate flanged member 24, which has a flange 25 to facilitate mounting it to the exhaust of an automobile engine. At the opposite end the device 20 may be provided with a machined member 26 which facilitates mounting the housing 21 to the exhaust pipe (not shown) of the automobile. The end members 27 and 28, respectively, preferably are formed rectangular in cross section. Accordingly they may be snugly fitted over opposite ends 21a and 21b of the housing 21, substantially as shown in FIG. 1. The ends 21a and 21b can be made fast to the arcuate member 24 and the member 27, by means of screws, and rivets, or can be welded thereto.

Referring now to FIGS. 3 and 4, the device 20 may be formed of a U-shaped elongated tray 30 provided with a U-shaped cover 31. The cover 31, by means of the screws or rivets 32 may be securely held to the tray 30. The channel 20 is made air tight by gasket material 34 interposed between the cover and the tray 30.

The housing 21 has at equidistant intervals along its length raised sections or 35 with threaded holes 36. The housing also has shaft holes 37 located between two adjacent or adjoining threaded holes 36. In like manner the U-shaped tray 30 is provided with holes 38 aligned with the holes 37 located in the cover 31.

A number of standard make spark plugs may be each of the threaded holes 36 with their spark-contacts facing into the elongated housing 21. A number of rotatable vanes 40 are mounted within the housing 21. The vanes 40 are mounted to rotate upon individual upright shafts 41, journaled at both ends to rotate within the upper and lower holes 37 and 38, respectively.

The rectangular vanes 40 are mounted upon the shafts 41 along a center line located off center with one side 40a substantially shorter than the other side 40b. Accordingly, as the vane rotates driven by the expanding gases in the blast chamber 20 the vertical edge of side 40b successively contacts one side and then the other of the U-shaped channel 30, while leaving a free space between the other side and the opposite side of the channel. As the vane rotates, by the nature of its eccentric mounting, it defines pockets of gas between each two successive spark plugs. For the sake of balance (because of their eccentric mounting) the vanes 40 may be provided with a number of extrusions 42, as shown in the FIGS. 1 to 4, that are added to the vanes during assembly to insure noiseless operation and reduce excessive vibration.

It is uderstood that the principles of the present invention may be readily applied to smog control requirements in allied fields as well, and in fact to any equipment burning coal or fuel oil (and sometimes to natural gas burners). In addition, the principle embodied in this invention may readily find application in home and city incinerators. For instance, FIG. 7 indicates the application of my smog control principle to a standard home incinerator 81 (private dwelling or an apartment house). Such an incinerator may consist of a brick frame structure 82 which at its lower section may be provided with a set of incinerator bars 83 upon which is piled the garbage 84 to be burned through a door 85. The combustible gases G moving upwardly are passed through the labyrinth of passage-ways such as indicated by the index numerals 86, 87, 88 and 89, and are exhausted into the atmosphere through the chimney 88a.

Within the passage-ways 87 and 88 there may be mounted a plurality of butterfly vanes 89 and 90 (similar in overall construction to the vanes already described in FIGS. 1 to 4, inclusive). Moreover, at appropriate locations along the entire length of the passage-ways there may be mounted a plurality of spark-plugs 91 and 92, respectively.

The operation of the incinerator smog control system is similar in general terms to the one above described. As the gases of combustion are passed through the butterfly vanes 89 and 90 the latter rotate at high speed to form pockets of volatile gases between a pair of spark-plugs. The spark-plugs in question are provided with the necessary electric current by means of a spark-plug generator or distributor (not shown). However, natural gas jets may be used, as well, in the place of the spark-plugs above referred to.

In FIG. 9 it can be discerned that the embodiment of my invention may also find aplication in power generating stations. FIGURE 9 shows diagrammatically the power station 93, which may be provided with a boiler 94 (of standard design). The boiler 94 comprises a row of boiler pipes 95. Boiler bars 96 are provided upon which coals may be burned (or the boiler can be operable through the medium of the conventional fuel oil delivered through the nozzle 97). The gases of combustion G escape through the channel 98 to enter the smog control chamber 99. The smog control chamber 99 in its general construction may be formed of sheet steel walls 100 and may have a plurality butterfly vanes 101. The latter may be mounted to rotate upon the upright shafts 102. The housing made of the walls 100 can be provided with a plurality of spark-plugs properly mounted among the butterfly vanes. The spark-plugs 103 are connected through wires to a spark-plug distributor (not shown). The operation of the smog control device here described is similar to the principle described in FIGS. 1 to 4, inclusive. It is of course, understood that natural gas jets (not shown) may be utilized in the place of spark-plugs. In some special cases, natural gas jets are more desirable than spark-plugs.

In both cases (house incinerator and the power plant) the smog blast chamber must be provided with a fresh air entry for supplying air to burn the combustible mixture. Reference being had to FIGS. 7 and 8, it can be seen that such an intake is indicated by the index numerals 81s and 82a respectively. In the boiler plant structure (in FIG. 9) the air intake opening is indicated by the index numeral 93a.

Reference being had to FIG. 8 (which is a modification), in this case the blast chamber 43 may consist of the elongated U-shaped channel 14, and the flat cover plate 45. The front end 43a of the chamber 43 may be secured to an arcuate flanged member 46 (which may be held thereto by means of machine screws, rivets or welding not shown). In like manner the opposite end 43b (of the channel 43) may be mounted to the U-shaped channel member 47. The latter, by means of machine screws, rivets or welding (not shown) may be securely held to the U-shaped member 43 above referred to. The flange members 46 and 47, with the channel member 43 and the cover 45, in this case comprise the blast chamber.

Along the entire length of the cover 45, there are provided a number of threaded holes 48. A spark-plug 49 may be mounted within each hole so that the spark-plug terminals face within the chamber 43, while the plug's contact point, is connected to the spark-plug distributor (not shown).

The cover 45 can be provided with a plurality of transverse holes 50. The cover 45 fits within the walls 44a and 44b in the U-shaped channel 44. The U-shaped channel 44 can be provided with clearence holes or openings 44c and 44d which are in alignment with the transverse holes 50 in the cover 45. A number of elongated bolt screws 51 are mounted into these holes to secure the cover 45 to the U-shaped blast chamber 4, substantially as indicated.

It can be descerned that the cover 45 is provided with a row of shaft holes 52, drilled from the inside of the cover (as shown) and being positioned one behind the other, in tandem. In like manner the bottom section 44e (of the channel 44) can be provided with a similar shaft holes 53 which may pass entirely through the bottom section 44e. The holes 52 and 53 are in perfect alignment and serve as bearings for the rotating stud shafts 54. From FIG. 9 it can be seen that the butterfly vanes 55 may be mounted upon the shafts 54 eccentrically thereto so that the holes in which the shafts 54 rotate are drilled off the center and away from the center line of the blast chamber 44. However, from FIG. 12, it can be seen that the holes 52 and 53, respectively, may be located within the center line of the blast chamber 44. In the latter case the side 55a of the blade 55 may be formed substantially shorter than its opposite side 55b. From FIG. 12 it can be seen the manner in which the exhaust gases bypass the butterfly vanes 55 in their way out to the atmosphere.

From FIG. 8 it can be seen in which manner the channel 44 can be made airtight to prevent seepage to the atmosphere through the employment of a gasket or gasket-like material 56. The gasket 56 encloses the lower ends of the stud shafts 55. It can be discerned that the lower ends of the shafts 55 rest directly upon the flat plate 57 which serves as thrust bearing for the shafts. The plate 57, by means of screws or rivets may be securely attached to the channel 44, substantially as indicated.

OPERATION

The embodiment of the present invention relates to smog-control equipment. These may comprise such devices which may find ready application in eliminating volatile materials and monoxide and hydrocarbon gases from the exhausts in automobiles, buses, trucks etc., and also in common home incinerators, and coal and fuel oil burning power generating stations. The following is a cursory description of the device of the present invention in its application to smog control in automobiles (see FIGS. 1 to 11, inclusive, and FIG. 15).

Referring to FIG. 1, which is a longitudinal section through the blast chamber 20 of the present invention, it can be discerned that the chamber is provided with a pair of inlet openings 22 and 57, and the single exhaust opening 23. Fresh air is sucked in through the opening 22, while volatile gases may reach the blast chamber 20 through the medium of the inlet pipe 58, which leads from the automobile exhaust (not shown) to the inlet opening 57 in the blast chamber proper.

Upon entering, the gas from the pipe 57 passes into the blast chamber 20 where it is directed to move towards the exhaust opening 23 and to strike the first butterfly vane VI which is free to rotate as it is mounted upon the vertical stud shaft 41. The gas then mixes with the incoming fresh air from the opening 22. As it passes along it strikes the second or adjacent butterfly vane V2. In similar manner the gas-and-air combination rotates the entire set of butterfly vanes in the blast chamber 20.

Under the influence of the mixture of gas and air passing through the blast chamber 20 at high speed the individual butterfly vanes rotate on their axles in one direction. During their rotation each respective vane can and does assume any possible angular position in its relationship with the next neighboring vane. However, irrespective of their relative manner of rotation and their position among one another one vane may find itself in a position parallel to that of an adjacent vane. In this relative position the vane V1 and the vane V2 in our example, form a gas pocket or a trap.

From FIG. 1 it can be discerned that there is a spark-plug 39 mounted in the very entrance where the gas passes into the smog control chamber 20. Another similar plug may be located between the vanes V1 and V2, respectively, etc. The entire row of spark-plugs 39, by means of wires w may be connected to the spark-plug distributor in the automobile (not shown) or a separate spark-plug distributor may be utilized, and may be driven independently from the car's motor. The sparking of the plugs in the blast chamber or the channel 20 is regulated by the spark-plug distributor and may occur in unison with the sparking of the spark-plugs in the internal combustion engine, although this is not entirely necessary. However, as the mixture of gas and air passes by the vanes V1 and V2 and is trapped between each consecutive vane, the gas mixture is ignited by the sparks and the volatile matter in suspension is burned and its contents reduced. This action occurs again and again as the gas-and-air mixture passes from one gas trap to another. It is, of course, assumed that by the time that the gas-and-air mixture reaches the last vane in the row located near the exhaust opening 23 the gas-and-air mixture would contain very little volatile material and will not be any longer combustible. At that very moment the gas-and-air mixture will be clear of smoke and will lack most of the volatile material it originally contained in suspension and will contain the minimum amount of monoxide gas and hydrocarbons.

It is, of course, understood that not the entire gas-and-air mixture will be entirely consumed or burned in pockets formed by the rotating vanes (above described). A lot of the gas-and-air mixture will be consumed by the radiating heat of the sparks and the heat of the blast chamber as the mixture of gas will rush towards the exit 23. Moreover, the rotating butterfly vanes will cause turbulence thus further helping and reducing the volatile material in the gas-and-air mixture. Also in the process of clearing the gas-and-air mixture of the volatile material suspended in it, a lot of energy will be produced which will dissipate freely into the atmosphere. However, it will be possible to direct the hot gas into a small gas turbine generator. There the gas-and-air mixture could be reduced to useful work, such as in operating the car's air conditioning system, etc.

A careful examination of the foregoing description in conjunction with the invention as illustrated in the drawings, will enable those skilled in the art and to obtain a clear understanding and impression of the alleged features of merit and novelty, sufficient to clarify the construction of the invention as hereinafter claimed.

What I claim is the following:

1. In a device for reducing the the volatile contents and the monoxide gas found suspended in the exhaust system of an automobile, the combination comprising: an elongated rectangular chamber, an air intake at one end thereof and an outlet at the opposite end in said chamber, a gas inlet located adjacent to said air inlet, said gas inlet connected to the exhaust system, a plurality of butterfly vanes mounted in series along said chamber, a plurality of stud shafts journaled in said chamber, said vanes being eccentrically mounted with said shafts for rotation with one side of the vane passing in close proximity to each of the side walls of said chamber as they rotate while leaving a free space for the gases to pass between the opposite side of the vanes and the opposite side wall; and a set of spark-plugs, with a spark-plug located between each adjacent pair of vanes, the gas mixture aforesaid being ignited and burned by said spark-plugs as the vanes rotate.

2. The combination according to claim 1; and said butterfly vanes being mounted one behind another, in tandem, upon a common center line, said chamber being divided by a center line into a left and a right chamber section, said center line upon which the stud shafts are mounted being located off center from the center line in the blast chamber, said butterfly vanes being rotated by the gas passing through said blast chamber to form consecutive gas pockets in which the gas mixture is combusted.

3. In a device of the class described to reduce volatile materials and monoxide gases found suspended in the exhaust systems of an automobile or the like, the combination comprising: an elongated chamber having an air intake opening at one end and an outlet opening in the opposite end, fresh air being sucked in through said intake opening, a gas inlet in said chamber being located adjacent to said air intake opening, said gas inlet connected to the exhaust system to direct gases of combustion into said chamber to mix with fresh air from said air intake; a plurality of rectangular butterfly vanes in said chamber, a plurality of stud shafts mounted in said chamber, said vanes being mounted eccentrically upon said stud shafts at intervals along said chamber for rotation with one side of said vanes passing in close proximity with one side of said rectangular chamber, while the opposite side of the vane passes at a distance from the opposite side of said chamber to form a free space between each vane and the walls of the chamber, said free space allowing a mixture of gas and air to pass through in the direction towards the outlet opening in said chamber; and a set of spark-plugs mounted in said chamber with one spark-plug being located between each two adjacent butterfly vanes to ignite the gas-and-air mixture in said chamber with the vanes rotating about their stud shafts to provide gas turbulence to burn the gas-and-air mixture more efficiently.

4. In a device to reduce volatile materials, monoxide gases and hydrocarbons found suspended in the exhaust of an automobile or the like, the combination comprising: a deep formed U-shaped channel of substantial length, a cover mounted over the top section of said U-shaped channel to form with said channel an elongated passage, stud shafts mounted along said channel to extend between said cover and said channel, an eccentric butterfly vane rotatably mounted on each stud shaft, said shafts being mounted in series along said channel, and a plurality of spark ignition devices mounted in said cover between adjacent pairs of butterfly vanes for periodic ignition to burn volatile gases passing through said channel.

5. In smog control devices to burn objectionable volatile material found suspended in the exhaust of an automobile or the like, the combination comprising: an elongated blast chamber, said chamber being rectangular in cross-section, a fresh air opening at one end of said chamber and a hot gas exhaust opening at the opposite end thereof, an automobile exhaust entry located adjacent to said fresh air opening, the exhaust gases from the automobile entering said chamber to be thoroughly mixed with fresh air to form a combustible mixture, means in said chamber to thoroughly mix the air with the car exhaust, and means for periodically igniting said mixture, said mixing means comprising a plurality of successive butterfly vanes eccentrically and rotatably mounted along the length of said chamber to turn within said chamber, said vanes in their rotation creating turbulence in the gas mixture to facilitate the efficient mixing and burning of the objectionable gases to be ignited and burned by said igniting means.

6. In a blast chamber to burn the exhaust gases from a common incinerator so as to reduce objectionable gases suspended therein, comprising, in combination, an elongated chamber, said chamber having a fresh air intake, and a hot gas exhaust opening, an entry for the gases of combustion from the incinerator allowing said gases to enter said blast chamber, said gas entry being located adjacent to said fresh air intake, means in said chamber to mix said gas thoroughly with the fresh air comprising a plurality of butterfly vanes eccentrically mounted upon rotatable shafts in the path of said gas-and-air mixture, and means to burn said mixture comprising a set of spark-plugs for igniting said gas-and-air mixture as it passes from said intake to said hot gas exhaust so as to burn the objectionable gases suspended in it and to free said gas mixture from its monoxide gas contents.

References Cited

UNITED STATES PATENTS

| | | | |
|---|---|---|---|
| 1,495,690 | 5/1924 | Hayes | 60—30 |
| 2,856,905 | 10/1958 | Bowen | 122—4 |
| 2,986,873 | 6/1961 | Smith | 60—30 |
| 3,177,650 | 4/1965 | Caruso | 60—30 |
| 3,228,755 | 1/1966 | Lottinville | 23—277 |
| 3,259,083 | 7/1966 | Evans | 23—277 |
| 3,285,709 | 11/1966 | Ennarino | 60—29 |

MARK M. NEWMAN, Primary Examiner

D. HART, Assistant Examiner

U.S. Cl. X.R.

23—277; 110—8

PO-1050
(5/69)

UNITED STATES PATENT OFFICE
CERTIFICATE OF CORRECTION

Patent No. 3,499,282          Dated March 10, 1970

Inventor(s) Genaro C. Celayan

It is certified that error appears in the above-identified patent and that said Letters Patent are hereby corrected as shown below:

Pages 1, 2, 3 and 4 of the drawings, line 1 at top, "G. G. CELAYAN" should read --G. C. CELAYAN--. Column 1, line 5, "Genaro G. Celayan" should read --Genaro C. Celayan--; line 21, "prelates" should read --relates--; line 59, "onto" should read --to--; line 61, before "passage" insert --the--. Column 2, line 20, after "chambers" insert --through--; line 20, after "gases" delete "through"; line 29, "housing the" should read --the housing--; line 30, after "spark plug" insert --distributor--. Column 3, line 13, before "passage" delete "the"; line 15, before "The" delete "end"; line 33, before "gasket" insert --a--;
line 41, "37" should read --36--; line 42, after "may be" insert --mounted into--; line 56, after "the" (first occurrence) insert --edge of the--; line 65, "uderstood" should read --understood--. Column 4, line 25, "aplication" should read --application--; line 36, after "plurality" insert --of--. Column 5, line 8, "4" should read --44--; line 14, after "with" delete "a"; line 51, "Fig. 15" should read --Figs. 15 and 16--. Column 6, line 52, after "art" delete "and".

SIGNED AND
SEALED
SEP 15 1970

(SEAL)
Attest:

Edward M. Fletcher, Jr.
Attesting Officer

WILLIAM E. SCHUYLER, JR.
Commissioner of Patents